April 4, 1961    R. C. GOERTZ ET AL    2,978,118
MANIPULATOR FOR SLAVE ROBOT
Filed Nov. 3, 1959    9 Sheets-Sheet 1

INVENTORS
Raymond C. Goertz
John H. Grimson
Frank A. Kohut
By: [signature]
Attorney

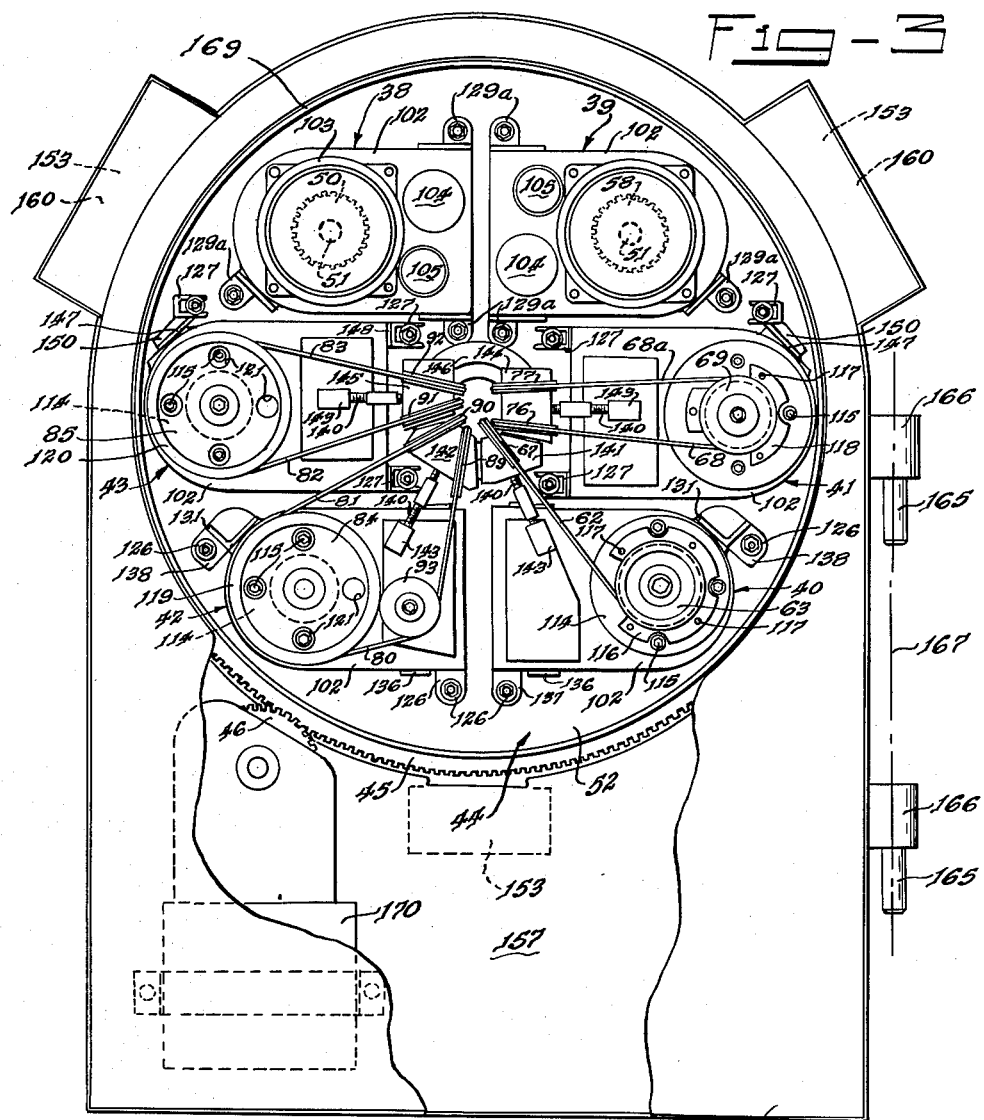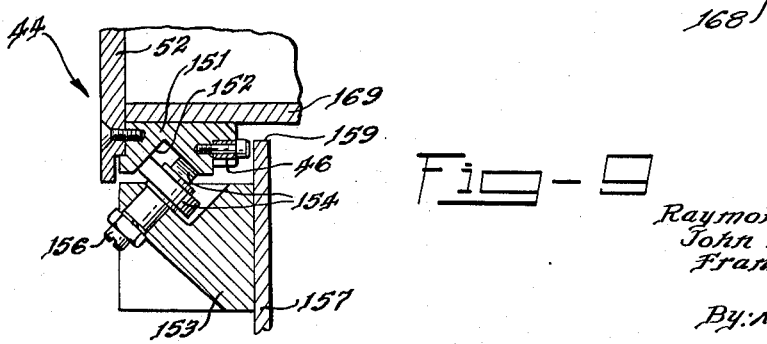

April 4, 1961 R. C. GOERTZ ET AL 2,978,118
MANIPULATOR FOR SLAVE ROBOT
Filed Nov. 3, 1959 9 Sheets-Sheet 4
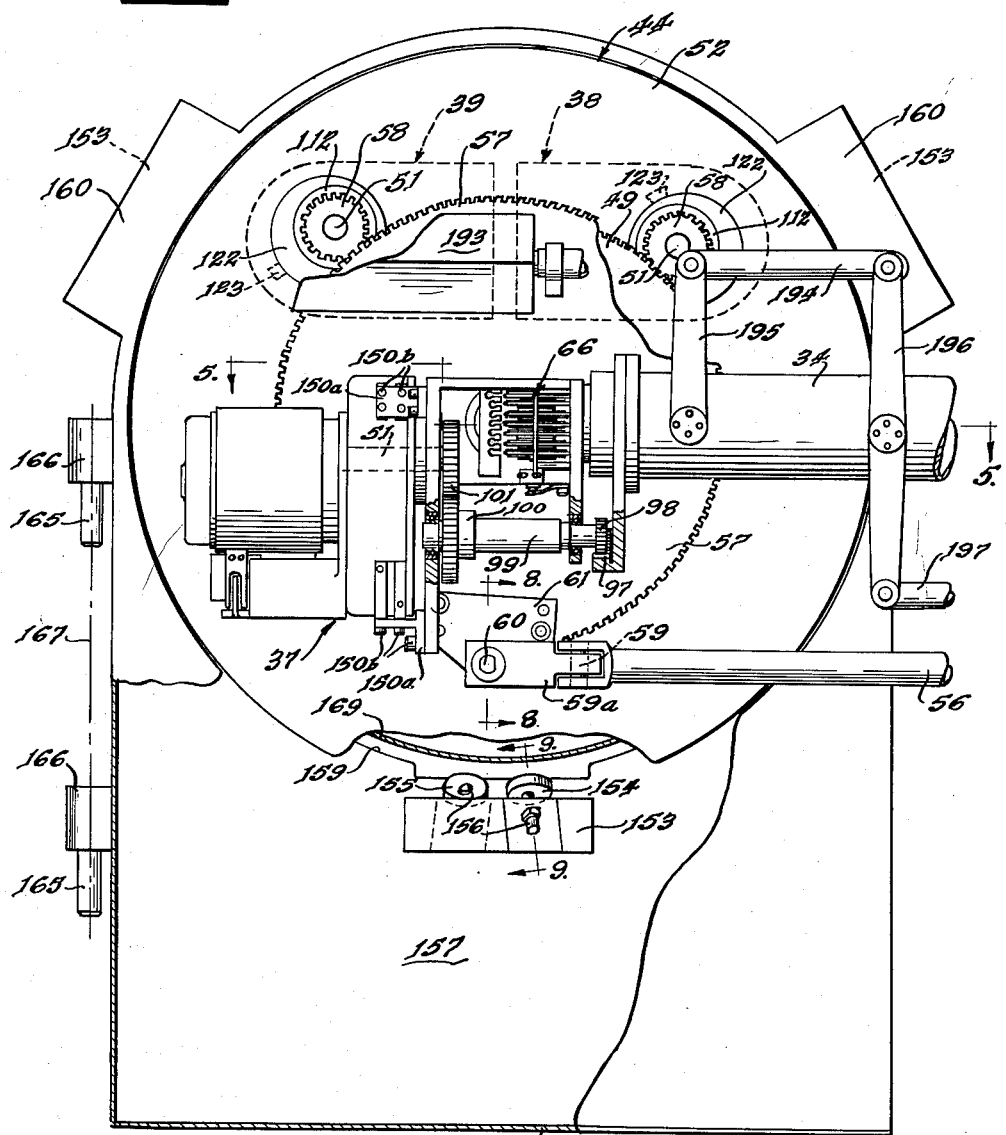
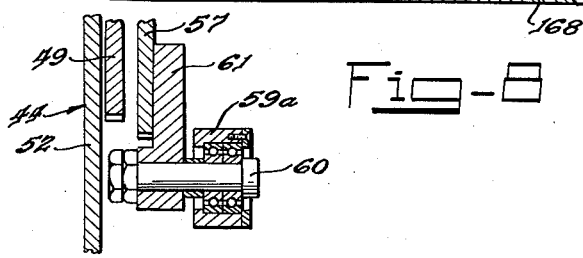
INVENTORS
Raymond C. Goertz
John H. Grimson
Frank A. Kohut
By: [signature]
Attorney

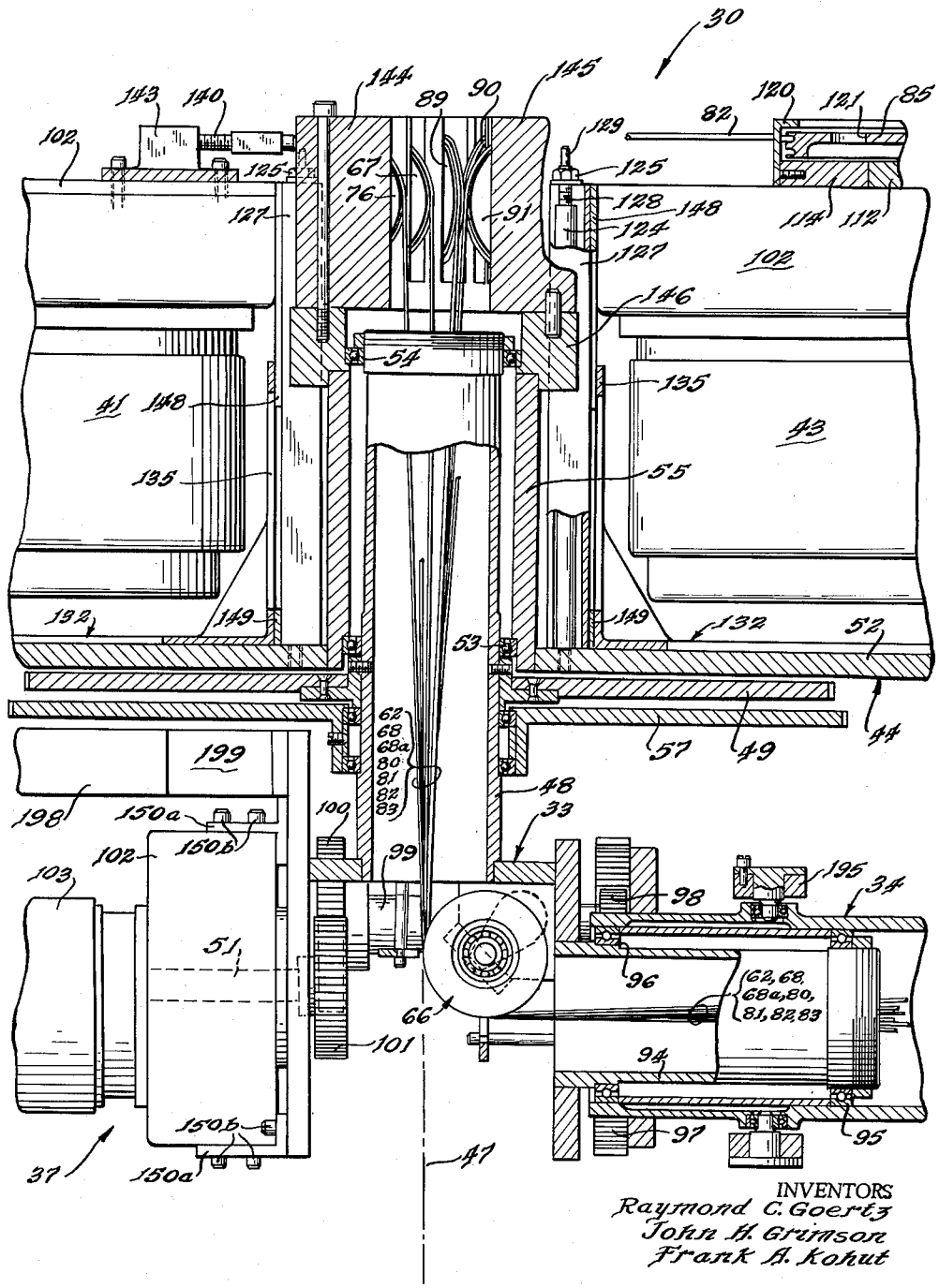

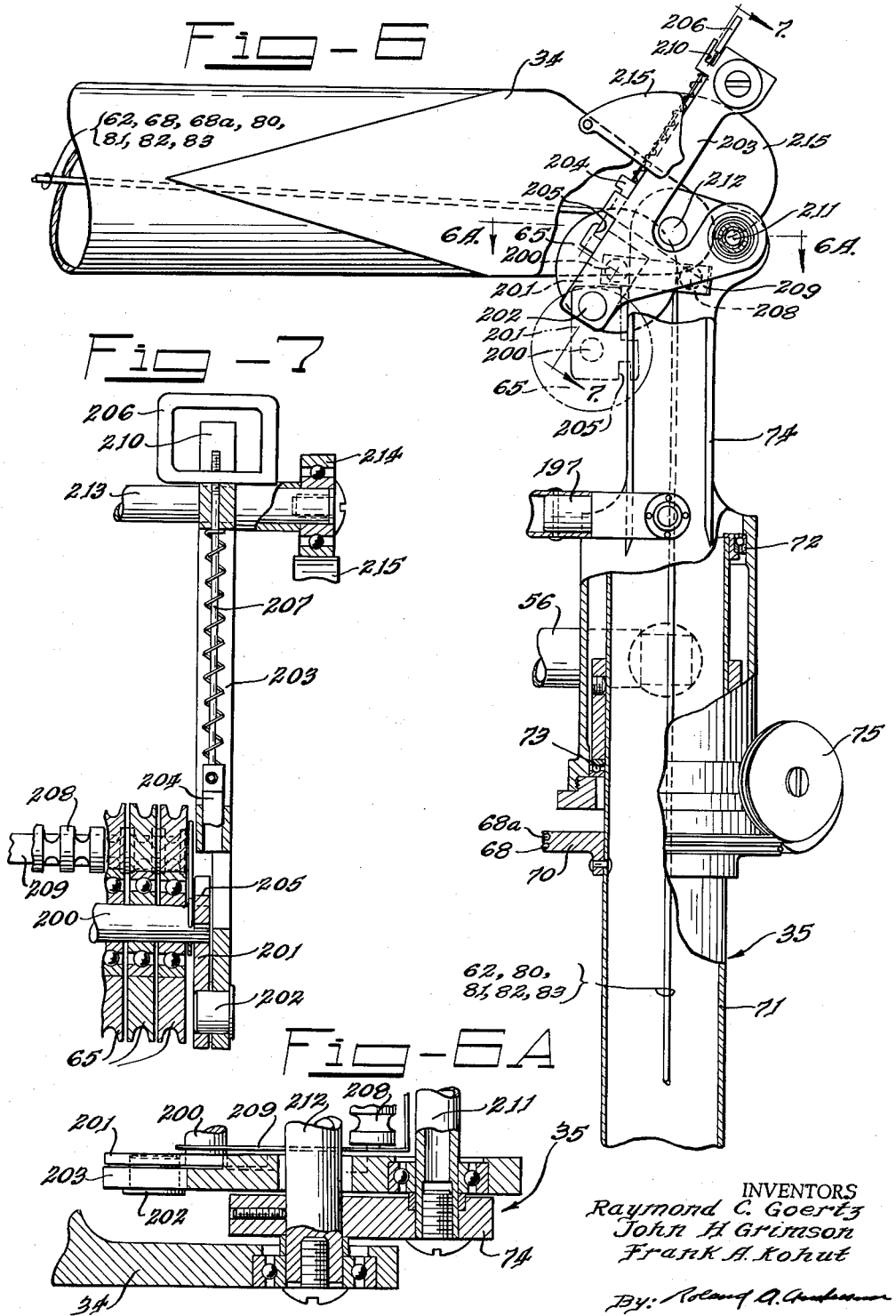

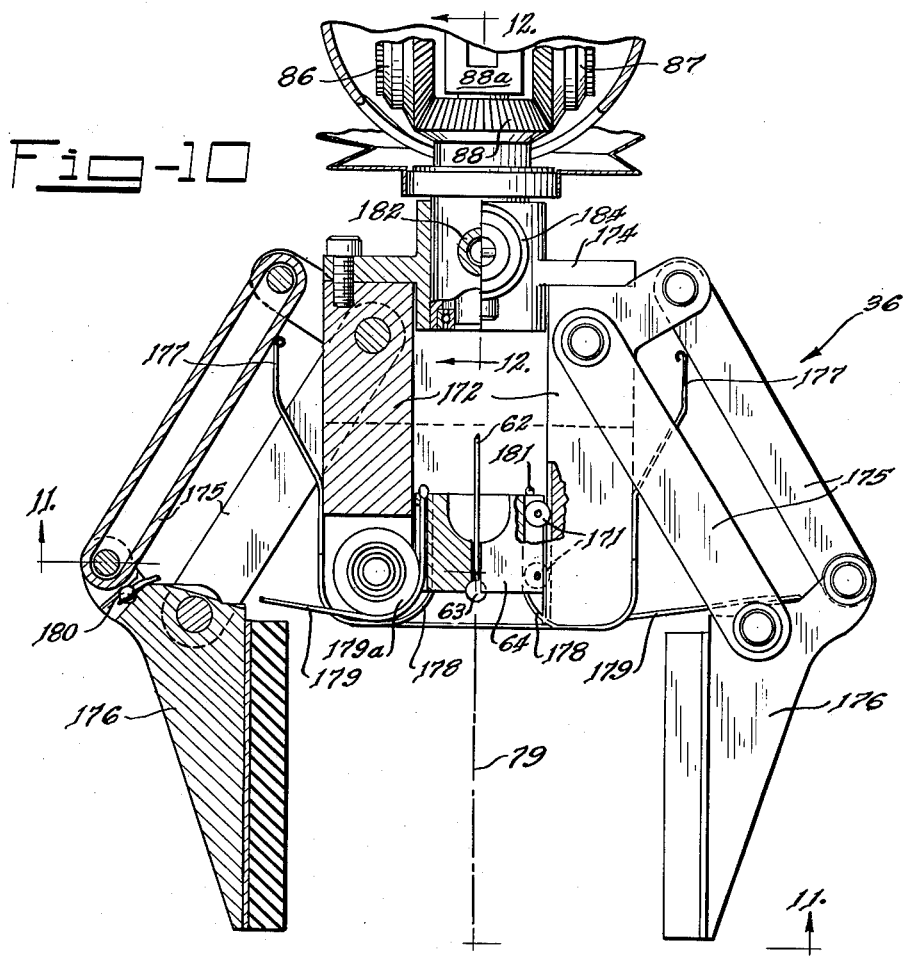

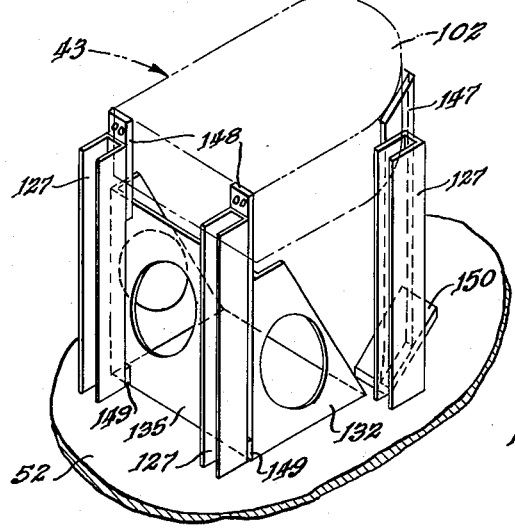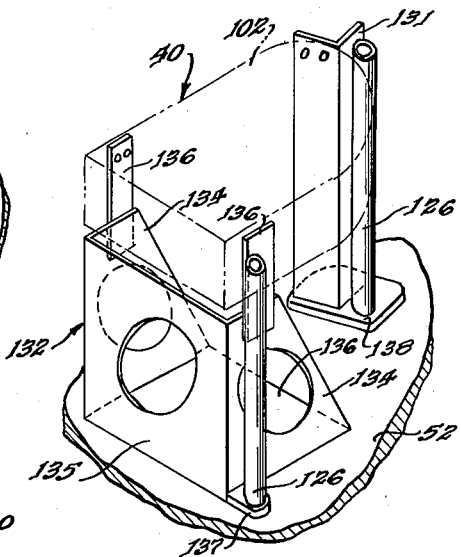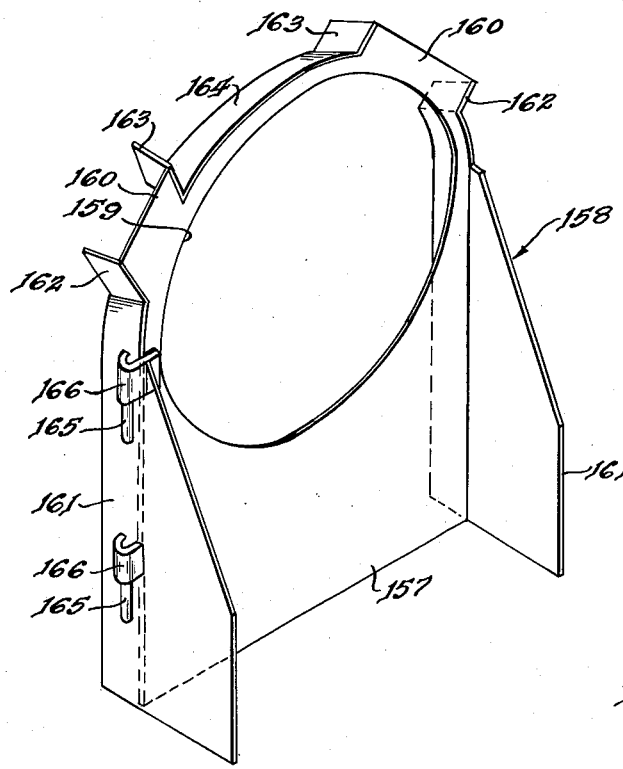

United States Patent Office 2,978,118
Patented Apr. 4, 1961

2,978,118

MANIPULATOR FOR SLAVE ROBOT

Raymond C. Goertz, Downers Grove, John H. Grimson, Villa Park, and Frank A. Kohut, Westmont, Ill., assignors to the United States of America as represented by the United States Atomic Energy Commission Filed Nov. 3, 1959, Ser. No. 850,745

7 Claims. (Cl. 214—1)

This invention relates to a remote-control manipulator in which slave and master units are electrically interconnected. More specifically, the invention relates to such a manipulator in which two slave units are mounted side by side on a mobile vehicle.

Goertz et al. Patent 2,846,084, dated August 5, 1958, discloses and claims a manipulator having master and slave units electrically connected with one another. With such a manipulator the master and slave units can be extensively separated from one another, and the slave unit can be completely sealed in an enclosure.

The present manipulator is an improvement of that of the above Goertz et al. patent in that two slave units as well as two master units are mounted side by side to take advantage of the two hands of the human operator and the two slave units are mounted on a mobile vehicle so as to reach a maximum amount of space.

One desirable feature of the assembly of two slave units and vehicle is that it takes up a relatively small amount of space so that it may be readily maneuverable and have access to the maximum space. Another desirable feature is that the slave units and vehicle should be readily repairable by another manipulator if operation in a sealed enclosure is indicated.

An object of the present invention is to provide a manipulator unit of compact arrangement and size which enable the unit along with a similar unit and a mobile vehicle carrying the units to occupy a small amount of space.

A further object is to provide a manipulator unit that is so constructed and arranged as to be readily repairable.

Other objects will become apparent from the description that follows and the attached drawings in which:

Fig. 3 is an elevational view, with parts broken away, of one side of a slave unit, as indicated by the line 3—3 in Fig. 2;

Fig. 4 is an elevational view, with parts broken away and in section, of the other side of the slave unit, as indicated generally by the line 4—4 in Fig. 2;

Fig. 5 is a sectional view taken on the line 5—5 of Fig. 4 and showing how the mounting and controls are to one side of the arms of the slave unit;

Fig. 6 is a fragmentary elevational view, partly in section, of the arms of the slave unit;

Fig. 6A is a sectional view taken on the line 6A—6A of Fig. 6;

Fig. 7 is a sectional view taken on the line 7—7 of Fig. 6 and showing the mounting of the cable pulleys at the pivot between the arms of the slave unit;

Fig. 8 is a fragmentary sectional view taken on the line 8—8 of Fig. 4 and showing how the link for the lower arm is connected with a gear;

Fig. 9 is a fragmentary sectional view taken on the line 9—9 of Fig. 4 and showing how the support is rotatably carried on rollers for indexing of the slave unit;

Fig. 10 is a fragmentary plan view, partly in section, of the grasper of the slave unit;

Fig. 11 is a sectional view taken on the line 11—11 of Fig. 10;

Figs. 14 and 15 are perspective views of brackets for attaching certain transducers to a supporting plate; and Fig. 16 is a perspective view of a carrying framework.

The remote control manipulator of the present invention comprises two slave units 30, two master units, not shown, and electrical connections between the units. The master units are not shown, because they are the same as the slave units 30, except for small differences that will be described later.

Figure 1:
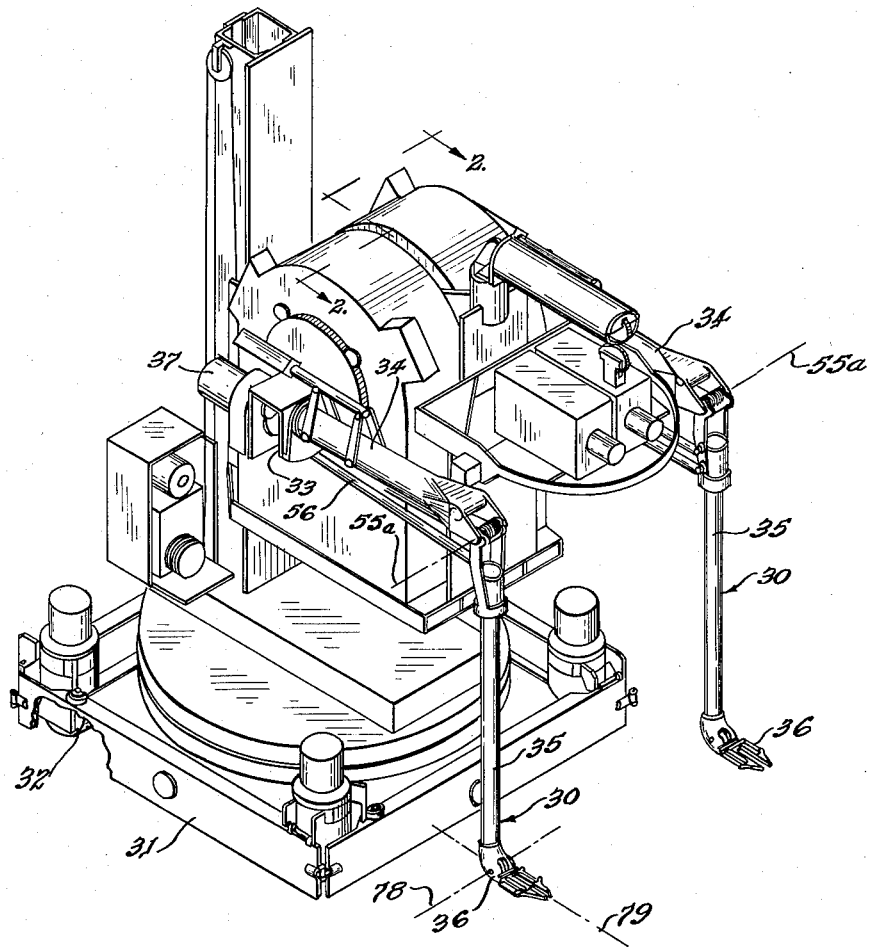
Fig. 1 is a perspective view of slave units of the manipulator of the present invention and the mobile vehicle carrying the slave units.
Figure 2:
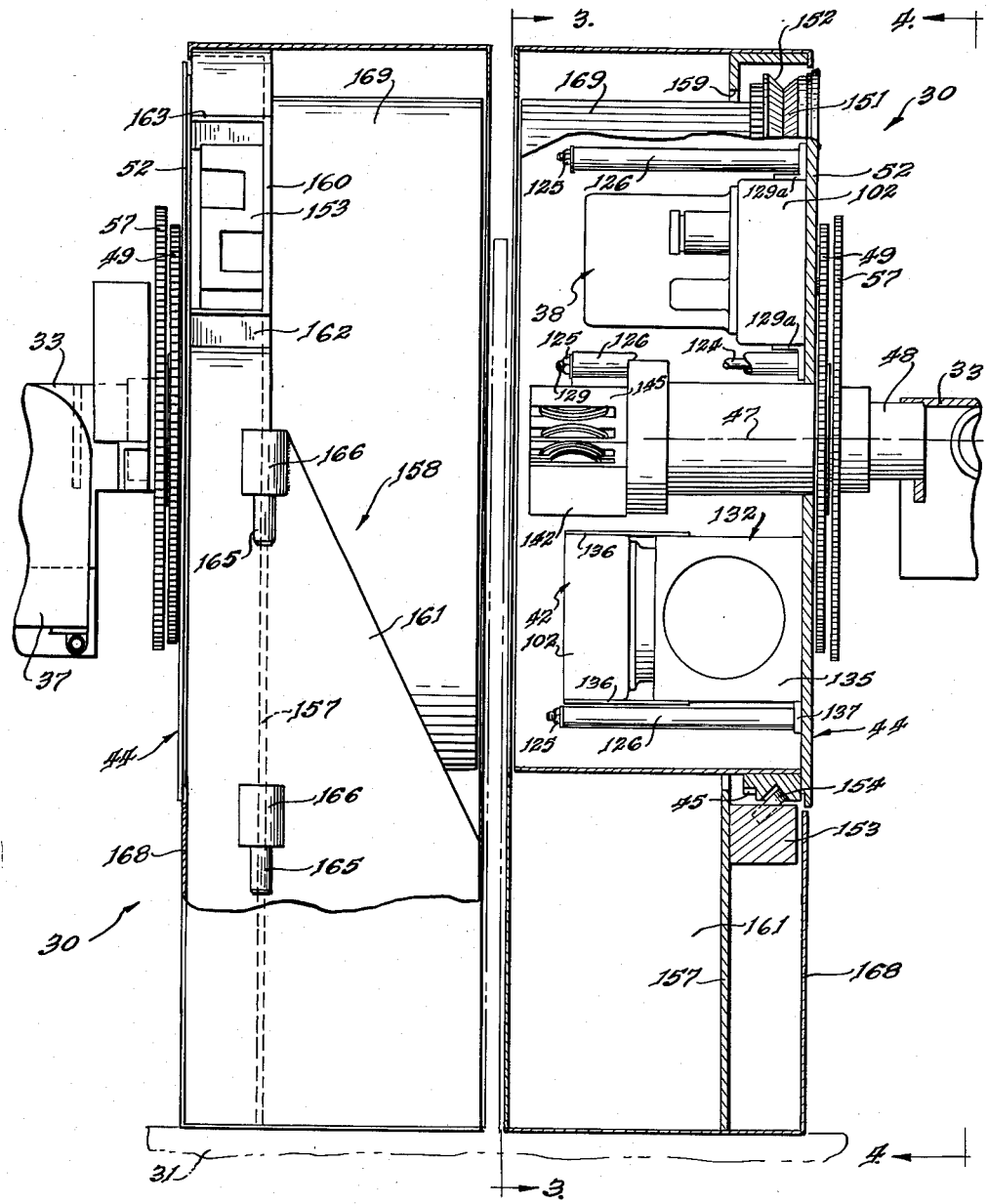
Fig. 2 is a sectional view taken on line 2—2 of Fig. 1 and showing how two slave units are arranged side by side.

As shown in Figs. 1 and 2, the two slave units 30 are adapted to be carried side by side on a vehicle 31 having four steerable driving wheels 32 at its corners. The vehicle 31 and its operation are disclosed and claimed in the copending application of Goertz et al., Serial No. 850,744, filed November 3, 1959. As shown on Figs. 1, 3, and 4, each slave unit 30 comprises a carriage 33, an inner arm 34 mounted therein, an outer arm 35 pivotally connected thereto, a tool 36 which takes the form of a grasper carried by the outer arm 35, and seven transducers 37, 38, 39, 40, 41, 42, and 43.

Each of the slave units 30 is electrically connected through the seven transducers with a master unit, not shown, so that seven types of motion occurring in the master unit are reproduced in the slave unit. The seven types of movement transmitted between the master and slave units are: (1) rotation of inner arm 34 about its own axis; (2) rotation of the inner arm 34 about an axis perpendicular to its own axis and located at the carriage 33; (3) rotation of the outer arm 35 about an axis located at the connection with the inner arm 34 and perpendicular to both arms; (4) opening and closing of the tool or grasper 36; (5) rotation of the tool 36 about the axis of the outer arm 35; and (6) and (7) rotation of the tool 36 about two axes located at the adjacent end of the outer arm 35. These seven motions are transmitted, respectively, through the seven transducers 37, 38, 39, 40, 41, 42, and 43 between the master and slave units as disclosed in the aforementioned Goertz et al. Patent 2,846,084. In addition, the slave units 30 can be indexed in both directions from the position shown in the drawings through a total angle of about 270°. As shown in Figs. 3 and 5, this indexing is accomplished by rotating a support 44, which mounts the carriage 33, by means of a ring gear 45 and a pinion 46.

One important feature of the present invention is that, as shown in Figs. 2–5, the transducers for motions (2)–(7), namely, 38, 39, 40, 41, 42, and 43, are all secured on the side of the support 44 opposite that at which the carriage 33 and the inner and outer arms 34 and 35 are located. This means that the width of each slave unit 30 is small and the two slave units 30 when mounted side by side as shown in Figs. 1 and 2 have a small overall width. The arms 34 and 35 and graspers 36 are on the outer sides of the slave units 30 so as to have sufficient lateral spacing from one another for joint operation, in spite of small overall width of the slave units 30.

As shown in Figs. 2 and 5, motion (2) takes place about an axis 47 which is perpendicular to the inner arm 34. As shown in Figs. 3, 4, and 5, this rotational motion is transmitted between the inner arm 34 and the transducer 38, through the carriage 33, a tubular member 48 attached to the carriage 33, a gear 49 secured to the tubular member 48, a pinion 50 meshing with the gear 49, and a shaft 51 secured to the pinion 50 and projecting through a plate 52, forming part of the support 44, into the end of the transducer 38 which is adjacent the plate 52. The tubular member 48 is journalled by bearings 53 and 54 in a sleeve 55, which forms part of the support 44. The axes of the tubular member 48 and the sleeve 55 are coincident with the axis 47, so that rotational movement of the inner arm 34 about the axis 47 occurs by virtue of the bearing mounting of the tubular member 48 in the sleeve 55.

As shown in Figs. 1, 3, 4, 5, and 8, motion (3) occurs about an axis 55a perpendicular to both arms 34 and 35 and is transmitted between the outer arm 35 and the transducer 39 through a link 56 connected at one end to the outer arm 35, a gear 57 connected to the other end of the link 56 and journalled on the tubular member 48, a pinion 58 meshing with the gear 57, and shaft 51 secured to the pinion 58 and projecting through the support plate 52 into the end of the transducer 43 adjacent the support plate 52. As shown in Figs. 7 and 8, the link 56 is pivotally connected by a pin 59 to a member 59a, which is journalled on a pin 60, which is secured to a piece 61 attached to the gear 57. The pin 60 is generally horizontal and the pin 59 is perpendicular to a plane containing the pin 60.

As shown in Figs. 3, 4, 5, 7, and 10, motion (4), that of opening and closing of tool 36, is transmitted between the tool 36 and transducer 40 through a cable 62 and a take-up sheave 63, about which one end of the cable 62 is wrapped and which is carried by the transducer 40 at the end thereof remote from the support plate 52. As shown in Fig. 10, the other end of the cable 62 has an enlargement 63a connecting the cable 62 to a slidable block 64 in the tool 36. As shown in Figs. 3, 4, 5, 6, and 10, the cable 62 goes through the tool 36, the outer arm 35, over the central or fourth one of a bank of seven pulleys 65 located adjacent the pivotal connection of the outer arm 35 with the inner arm 34, through the inner arm 34 over the central or fourth one of a bank of seven pulleys 66 located in the carriage 33, through and beyond the tubular member 48 generally perpendicularly to the inner arm 34, over a pulley 67, and radially outwardly of the tubular member 48 to the take-up sheave 63 on the transducer 40.

As shown in Figs. 3, 4, 5, 6, and 7, motion (5), rotation of the tool 36 about the axis of the outer arm 35, is transmitted between the tool 36 and the transducer 41 by means of cables 68 and 68a, each of which has one end trained over and secured to a pulley or take-up sheave 69 on the end of the transducer 41 remote from the support plate 52. The other end of each of cables 68 and 68a is secured to and trained over a pulley 70 secured to a tubular member 71 near its upper end. The tubular member 71 has its lower end attached to the tool 36 and forms a part of the outer arm 35 which is rotatable about the axis thereof and is journalled by means of bearings 72 and 72a in a nonrotatable member 73, also forming part of the outer arm 35. The cables 68 and 68a extend from the pulley 70 over idlers 75, along the nonrotatable member 74, over the first and seventh pulleys 65 through the inner arm 34, over the first and seventh pulleys 66, in the carriage 33, through and beyond the tubular member 48, over pulleys 76 and 77, and radially outwardly of the tubular member 48 to the pulley 69 on the transducer 41.

As shown in Fig. 1, motions (6) and (7) involve rotation of the tool 36 about axes 78 and 79 which are located at the tool and are perpendicular to one another, axis 78 also being perpendicular to the outer arm 35. Motions (6) and (7) are transmitted between the tool 36 and transducers 42 and 43 by means of cables 80, 81, 82, and 83. As shown in Fig. 3, cables 80 and 81 at one end are attached to and trained over a take-up sheave 84 on the end of the transducer 42 remote from the support plate 52, and cables 82 and 83 at one end are attached to and trained over a take-up sheave 85 on the end of the transducer 43 remote from the support plate 52. At the other end cables 80, 81, 82, and 83 are connected to two take-up sheaves, not shown, drivingly connected, as disclosed in Figs. 4, 5, and 6 of Goertz et al. Patent 2,764,301, dated September 25, 1956, to two differential side gears 86 and 87, which may be seen in Fig. 10 of the present application. Gears 86 and 87 rotate on the axis 78 and mesh with differential pinion 88, which is journalled on a yoke 88a to rotate about the axis 79. The yoke is mounted on the lower end of the outer arm 35, so as to swing about the axis 78. When gears 86 and 87 rotate in the same direction, rotation of the tool 36 about axis 78 occurs. When gears 86 and 87 rotate in opposite directions, rotation of the tool about axis 79 occurs. As shown in Figs. 3, 4, 5, and 6, the cables 80, 81, 82, and 83 extend through and along the outer arm 35, over the second, third, fifth, and sixth pulleys 65, through and along the inner arm 34, over the second, third, fifth, and sixth pulleys 66, transversely to the inner arm 34 through and beyond the tubular member 48, over pulleys 89, 90, 91, and 92, respectively, and generally radially outwardly to the take-up sheaves 84 and 85. The cable 80 also passes over a take-up pulley 93 located on the end of the transducer 42 remote from the support plate 52.

As shown in Figs. 4 and 5, the transducer 37, for motion (1), rotation of the inner arm 34 about its own axis, is mounted on the carriage 33 in general alignment with the inner arm 34 and on the opposite side of the transverse axis 47. The inner arm 34 is journalled for rotation about its own axis on a tubular extension 94 of the carriage 33 by means of bearings 95 and 96. The rotation of the inner arm 34 about its own axis is transmitted between the inner arm 34 and the transducer 37 through an internal segmental gear 97 on the inner arm 34, a pinion 98 meshing with the gear 97, a shaft 99 secured to the pinion 98 and extending through and journalled in opposite sides of the carriage 33, a pinion 100 secured to the shaft 99, a gear 101 meshing with pinion 100 and secured to an extension of shaft 51 of the transducer 37 projecting through one side of the carriage 33.

Each of the transducers 37, 38, 39, 40, 41, 42, and 43 comprises, as is evident from the transducers 38 and 39 in Fig. 3, a gear box 102, a motor 103, a tachometer 104, and a synchro transmitter 105, the last three parts being attached to and projecting from the gear box 102. The shaft 51 of each transducer is connected through suitable gears with the motor 103, tachometer 104, and synchro transmitter 105, as disclosed in the aforementioned Goertz et al. Patent 2,846,804, except that in the present application the tachometer 104 is mounted separately on the gear box 102 and is drivingly connected separately with the shaft 51, rather than being mounted on the motor 103 and drivingly connected therethrough as in this Goertz et al. patent. The synchro transmitter 105 is of course used as part of each transducer on the slave unit, whereas the corresponding element on the master unit is a synchro control transformer. Reference is made to Figs. 15 and 16 and the related description of the Goertz et al. patent for a disclosure of the electrical connection between the corresponding transducers of the master and slave units.

Figure 13:
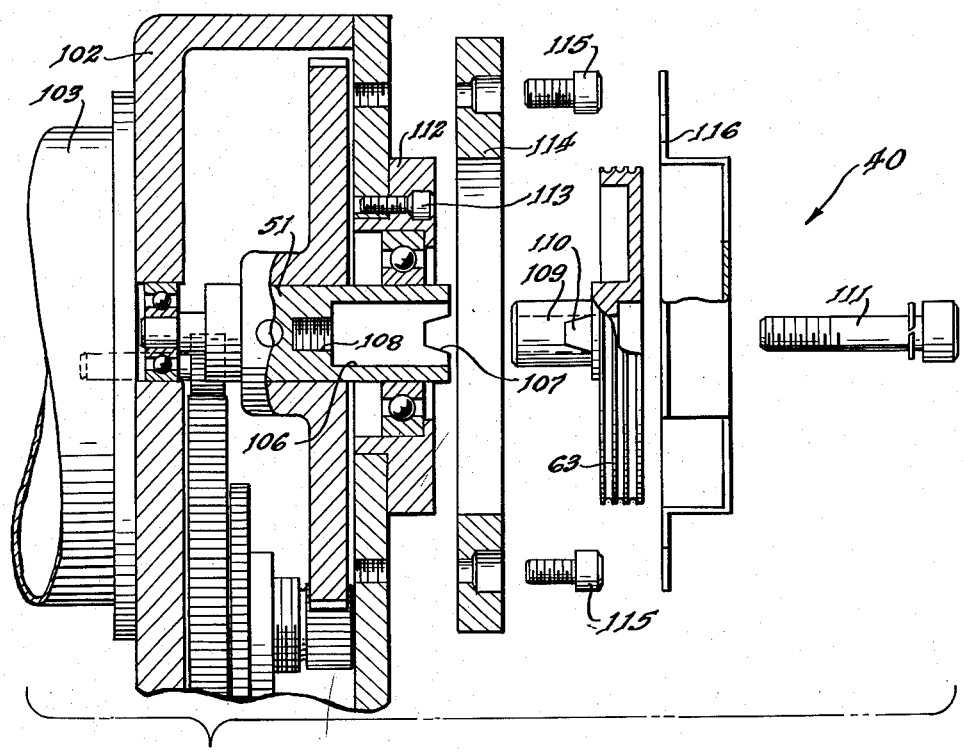
Fig. 13 is an exploded sectional view showing how a driving pulley for a transducer of the slave unit is connected.

As shown in Fig. 13 for transducer 40, the shaft 51 of each transducer has an axial recess 106, diametrally opposed notches 107 in the shaft 51 at the open end of the recess 106, and a threaded hole 108 extending from the closed end of the recess 106. As shown for the take-up sheave 63 of the transducer 40, each of the take-up sheaves 63, 69, 84, and 85 of transducers 40, 41, 42, and 43 and of the pinions 50 and 58 of transducers 38 and 39 has a hub 109 and diametrally opposed lugs 110, received, respectively, in axial recess 106 and notches 107 in the shaft 51 for driving connection of the take-up sheave or pinion with the shaft 51. A screw 111 extends through the hub 109 and is threaded into the hole 108 so as to hold the shaft and take-up sheave or gear together. An inner ring 112 fits in an opening in the gear box 102 and projects therefrom, being secured thereto by screws 113. For each of transducers 40, 41, 42, and 43, an outer ring 114 is secured to the gear box 102 around the inner ring 112 by three screws 115 spaced 90° apart. As shown in Figs. 3 and 13, the transducer 40 has a guard 116 which is secured to the outer ring 114 by screws 117 and which loosely encloses the take-up sheave 63 so as to retain the cable 62 thereon when the take-up sheave 63, outer ring 114, and guard 116 come loose as a unit upon removal of the screws 111 and 115, whereupon the rest of the transducer 40 can be disconnected from the support plate 52 and replaced. The guard 116 is, of course, open at one side to accommodate the portion of the cable 62 between the sheave 63 and the pulley 67.

The transducer 41 has a guard 118 which is generally similar to the guard 116 of transducer 40, being attached to the outer ring 114 by screws 115, but being open on two sides to accommodate the exit of the cables 68 and 68a from the take-up sheave 69 to the pulleys 76 and 77.

The transducers 42 and 43 differ in that their take-up sheaves 84 and 85 are larger in diameter than the take-up sheaves 63 and 69 of the transducers 41 and 40, and so have cable-retaining guards 119 and 120 of appropriately larger diameter, which are connected to the peripheries of the outer rings 114 of transducers 42 and 43, rather than to the end surfaces of these rings 114 as is the case with the guards 116 and 118 of the transducers 40 and 41. The guards 119 and 120 are of course each open on two sides to permit the cables 80 and 81 and the cables 82 and 83, respectively, to exit from the take-up sheaves 84 and 85 and extend to the pulleys 89, 90, 91 and 92. Each of the take-up sheaves 84 and 85 has four openings 120 90° apart, any thereof which are alignable with the three screws 115 attaching the outer ring 114 to the gear box 102 of each of transducers 42 and 43, so that access is had through the openings 121 to the screws 115 for removal thereof.

As shown in Fig. 4, each of transducers 38 and 39, has, instead of the outer ring 114 which is of uniform radial thickness, an eccentric annulus 122 having its periphery tightly fitted in an opening in the support plate 52 and its opening engaging the periphery of the inner ring 112. The opening in the eccentric annulus 122 is eccentric to the periphery thereof so that the radial thickness of the eccentric annulus varies. Each annulus 122 has a tail 123 by which the annulus may be rotatively adjusted in the support plate 52 and thus the transducer 38 or 39 shifted to change the mesh of the pinion 50 or 58 with the gear 49 or 57.

As shown in Fig. 2 for the transducers 38 and 42, the transducers 38 and 39 are positioned so that their gear boxes 102 lie directly adjacent the support plate 52, and the transducers 40, 41, 42, and 43 are positioned so that their gear boxes 102 are spaced from the support plate 52 and their motors 103, tachometers 104, and synchro transmitters 105 project from the gear boxes 102 toward the support plate 52. All the transducers 38–43 are attached by long rods 124 threaded into the support plate 52 and nuts 125 threaded on the ends of rods 124 remote from the support plate 52, as shown in Figs. 2 and 5. The nuts 125 are applied against the ends of long tubes 126 (Figs. 2 and 14) on the transducers 38, 39, 40, and 42 and long channels 127 (Fig. 15) on the transducers 41 and 43. The long rods 124 and the long tubes 126 or long channels 127 bring the attaching nuts 125 out in the open away from the cramped spaces between the transducers at the support plate 52 so that the nuts are easily applied or removed for replacement of the transducers, and the rods 124 and tubes 126 or channels 127 provide for support for the transducers while the nuts 125 are being applied or removed. The free ends of the rods 124 have threaded portions 128 of appreciably reduced diameter and smooth extensions 129 therebeyond, which help to guide the rods 124 into the tubes 126 on the channels 127 as the transducers are being brought toward the support plate 52 for attachment thereto.

As shown in Figs. 2 and 3, each of the transducers 38 and 39 has three angle pieces 129a which are secured as by welding or bolting to the gear box 102 and are welded to the long tubes 126 at one end thereof. The angle pieces 129a have openings aligned with the tubes 26.

As shown in Figs. 2, 3, and 14, each of the transducers 40 and 42 is carried by an L-shaped post 131 and a box-like bracket 132, which comprises an end 133, opposed sides 134, and a connecting side 135. The bracket 132 is open opposite the side 135 and has openings in the sides 134 and 135 to reduce weight. Extension pieces 136 are secured as by welding to the opposed sides 134 and carry the gear box 102 between them, being secured to the gear box by bolting or welding, so that the motor 103, tachometer 104, and synchro transmitter 105 extend from the gear box 102 within the bracket 132 toward the end 133 without touching the bracket. The end 133 rests against the support plate 52. The bracket 132 carries a short perforated extension 137 on the end 133 beyond one side 134. One of the long tubes 126 associated with the transducer 40 or 42 has an end welded to the extension 137 in alignment with the opening therein. The other of the associated tubes 126 has one end welded to a perforated foot 138 resting against the support plate 52. One end of the post 131 is welded to the foot 138, and the other end is bolted or welded to the gear box 102 of the transducer 40 or 42.

Each of the transducers 40 and 42 is held against the support plate 52 at two points by the rods 124 through the extension 137 on the bracket 132 and the foot 138 on the post 131 and, as shown in Fig. 3, at a third point through engagement of a threaded rod 140 against a pulley block 141 for the transducer 40 or a pulley block 142 for the transducer 42. The rod 140 is threaded through a bracket 143 mounted on the gear box 102. The pulley blocks 141 and 142 journal the pulley 67 and the pulleys 89 and 90, respectively, and, together with pulley blocks 144 and 145 for the pulleys 76 and 77 and pulleys 91 and 92, respectively, are bolted to a collar 146, secured to the end of the sleeve 55 of the support 44, as shown in Figs. 3 and 5.

As shown in Figs. 5 and 15, each of the transducers 41 and 43 is held against the support plate 52 by a post 147 and a box-like bracket 132. In this case extension pieces 148 are welded to the connecting side 135 of bracket 132 and are bolted or welded to the gear box 102. Two long channels 127 are welded to the extension pieces 148 and through spacer parts 149 to the connecting side 135 adjacent the end 133 of the bracket 132. A third long channel 127 is welded to one edge of the post 147. A foot 150 welded to the end of the post 147 remote from the gear box 102 rests against the support plate 52. Since, for the transducers 41 and 43, the long rods 124, which with nuts 125 attach the transducers 41 and 43 to the support plate 52, are in the channels 127, the transducers 41 and 43 can be adjusted radially outwardly as viewed in Fig. 3 to tighten the cables 68, 68a 91 and 92. Such adjustment is produced by axial shifting of the threaded rods 140 against the pulley blocks 144 and 145, through rotation thereof in brackets 143 mounted on the gear boxes 102 of the transducers 41 and 43.

Since the tubes 126 fit the rods 124 fairly closely, the transducers 40 and 42 cannot be shifted along the support plate to tighten the cables 62, 80, and 81. For transducer 42, the cable 81 can be tightened by rotation of the take-up sheave 84, and the cable 80 can be tightened by shifting of the pulley 93 along the gear box 102. The transducer 40 has only the cable 62, which can be tightened by rotation of the take-up sheave 63.

As shown in Figs. 4 and 5, the transducer 37 is secured to the carriage 33 by brackets 150a and screws 150b which go through the bracket are threaded into the carriage 33 and the gear box 102.

As previously stated, the present construction provides an eighth motion not occurring with the construction disclosed in Goertz et al. Patent 2,846,084, namely, that of indexing the support 44 and the transducers 38–43 carried by the support through a substantial angle. Such indexing is highly desirable, because the inner arm 34 can rotate about the axis 47 only through a somewhat limited angle, since such rotation of the inner arm 34 must necessarily involve the bank of pulleys 66 in the carriage 33. Such rotation changes the tightness of the cables, for the bank of pulleys 66 will rotate with respect to the pulleys 67, 76, 77, 89, 90, 91, and 92. Particularly the cables over the outer pulleys 66 will be affected. This occurs more with the present construction than that of the Goertz et al. patent, since in the present construction all the cables go to one side of the inner arm 34 and so the bank of pulleys 66 must be seven high, whereas in the Goertz et al. patent the cables go to both sides of the inner arm, and so there are two banks of pulleys, one three high and the other four high.

As shown in Figs. 4 and 9, to the support plate 52 is attached a ring 151, which has in its periphery a track or groove 152. Spaced about the ring 151 are three blocks 153 each of which carries two rolls 154 and 155 which lie in planes perpendicular to one another and engage the two sides of the groove 152 to give the support plate 52 lateral as well as vertical support. The rollers 154 and 155 protrude from recesses in the blocks 153 in which they are journalled on rods 156 secured to the blocks 153. The gear 45 through which the pinion 46 acts to rotate the support plate 52, is secured to the ring 151.

As shown in Figs. 3, 4, and 16, the blocks 153 are mounted on a plate 157 of a carrying framework 158, one block 153 being attached to the plate 157 just below a circular opening 159 therein, and the other two blocks 153 being attached to extension 160 projecting from the upper arcuate edge of the plate 157. The plate 157 is generally rectangular, with its longer dimension being vertical, except for its upper arcuate edge and the opening 159, which is concentric with the arcuate edge. In addition to the plate 157, the framework 158 comprises two flanges 161 welded to the vertical edges of the plate 157 from the bottom to the region where the upper arcuate edge of the plate 157 begins. As viewed in Figs. 2 and 16, each flange 161 has to one side of the plate 157, a portion that is of uniform width through the length of the flange. To the other side of the plate 157 each flange 161 has also a portion that has a lower region of uniform width greater than that of the aforementioned flange portion, and an upper region decreasing in width in an upward direction to a very small amount and terminating short of the upper end of the leftwardly extending flange portion. The framework 158 also includes flanges 162 welded to the lower sides of the extensions 160 and to the upper ends of the flanges 161, as well as flanges 163 welded to the upper sides of the extensions 160 and a curved flange 164 welded to the upper curved edge of the plate 157 and to the flanges 163.

The framework 158 is pivotally carried by means of vertically spaced vertical pins 165, which are welded to and within U-shaped straps 166, which extend through one of the flanges 161 and embrace and are welded to the plate 157. The unit may be angularly shifted about an axis 167 coincident with that of the pins 165 so that the transducers 38–43 are exposed for repair, adjustment, or replacement.

Each unit is housed in a casing 168 which, like the plate 157, is generally rectangular and curved at its upper end and is provided with extensions accommodating the two upper blocks 153 and the extensions 160 to which they are attached. The casing 168 is supported on the flanges 161, 162, 163 and 164 of the framework 158 and has circular openings in its opposite sides accommodating the support plate 52 and the transducers 38–43 attached thereto. The transducers 38–43 are enclosed in a cylindrical shell 169 which is secured to the interior of the ring 151 so as to extend from the support plate 52 into adjacency with the opposite side of the casing 168.

The pinion 46, which drives the gear 45 to index the support plate 52, is driven by a motor 170 carried by the plate 157 of the carrying structure 158. The master unit will have a similar arrangement for indexing its support plate and the transducers mounted thereon. However, the indexing means of slave and master units are not interconnected with transducers as are the means for transmitting motions (1) to (7), but are operated independently. Thus it is possible to manipulate the tool 36 of the slave unit near the ceiling of a cave, without requiring the tool 36 of the master unit to be at a correspondingly high level.

As shown in Figs. 10 and 11, the block 64 carries four rollers 171 on each of two opposite sides, which rollers run in grooves in opposed members 172. The members 172 have thin abutting portions 173 beneath the block 64 and are secured to a collar 174. Each member 172 carries one end of a set of three parallel links 175 connected at their opposite end to one of two jaws 176. The jaws 176 are yieldingly urged apart by a spring member 177, the ends of which engage two of the parallel links 175. An intermediate region of the spring member 177 is secured to the ends of the opposed members 172 and has pressed-out fingers 178 which project into the space between the opposed members 172 and limit the outward travel of the block 64. The block 64 is connected to the jaws 176 by short cables 179 passing over pulleys 179a and having at their ends enlargements 180 engaging the jaws 176 and enlargements 180 engaging the block 64.

Figure 12:
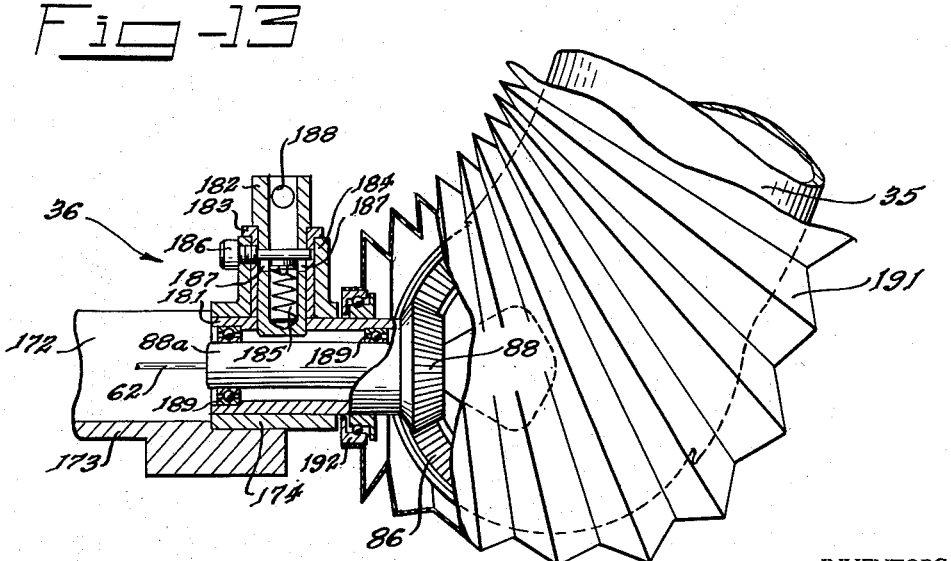
Fig. 12 is a sectional view taken on the line 12—12 of Fig. 10 and showing the removable connection of the grasper to the outer arm of the slave unit outside a protective boot.

As shown in Fig. 12, collar 174 receives a sleeve-like hub 181 of the differential pinion 88 and is connected thereto by a retractable pin 182 which is mounted for limited rotation in a bushing 183 attached in a protrusion 184 formed in the collar 174. The pin 182 projects through an opening in the hub 181 and is held in this opening by a coil spring 185 within the pin 182 and a retainer 186 having threaded engagement with the bushing 183 and the protrusion 184 and extending through two opposed generally L-shaped slots 187 in the pin 182. When the hub 181 is to be released from the collar 174, the pin 182 is rotated by a tool inserted through an opening 188 in the externally protruding end of the pin 182. Rotation of the pin 182 causes the slots 187 to cam the pin 182 outwardly against the retainer 186 and against the action of the spring 185.

When the pin 182 is retracted to release the hub 181 from the collar 174 so that the grasper 36 is separated from the outer arm 35, the differential pinion 88 and its hub 181 stay with the outer arm 35, since the hub 181 is rotatably retained on the yoke 88a by bearings 189.

When the grasper 36 is to be released from the outer arm 35, the grasper is held horizontal, the jaws 176 are brought together by external forces directly applied, and the end of the cable 62 is freed from the block 64 by being lifted out through a slot 190 formed in the block 64.

The lower end of a protective boot 191 covering the lower portion of the outer arm 35 is carried by a bearing 192, which rotatably engages the hub 181 of the differential pinion 88 while being permitted no axial movement with respect to the hub 181 and thus keeping the boot 191 free of engagement with the pin 182 on the protrusion 184 on the collar 174.

As shown on Figs. 1, 4, and 6, a counterweight 193 for the outer arm 35 is carried by a tubular member 194, which is supported on parallel links 195 and 196, which straddle and are pivotally connected to the tubular member 194 and the inner arm 34. The link 196 extends beyond its connection with the inner arm 34 and is connected with a link 197 which is tied to the outer arm 35 near its upper end, more particularly, to the nonrotatable member 74 of the outer arm. As shown in Fig. 5, a counterweight 198 for the inner arm 34 is secured to an extension 199 of the carriage.

The tool or grasper 36 can be adjusted or repaired more easily if it is disconnected and moved away from the outer arm 35 a small distance. This is made possible by mounting the pulleys 65 in such a way that the cables 62, 80, 81, 82, and 83 can be loosened. As shown in Figs. 6, 6A and 7, the pulleys 65 are journalled on a shaft 200 mounted at its ends on two arms 201 carried on two pins 202 protruding from two members 203, which are tied on aligned pivots to the upper end of the nonrotatable member 74 of the outer arm 35. Figs. 6, 6A, and 7 show the parts associated with only one end of the pulley shaft 200. Each arm 201 is held against angular movement with respect to the associated member 203 by a retractable spring-urged plunger 204, which engages a slot 205 on the arm 201 and is slidably mounted in the member 203. The plunger 204 is controlled by a handle 206 connected to plunger 204 by a rod 207.

When the plunger 204 at each end of the bank of pulleys 65 is retracted from the slot 205, the arms 201 swing about the pins 202 to drop the pulleys 65 from the full-line position of Fig. 6 to the dotted-line position thereof, thereby loosening the cables 62, 80, 81, and 83 and incidentally cables 68 and 68a. In spite of being loosened, the cables are held on the pulleys 65 by a guard 208, which has its ends rotatably mounted in the legs of a wide short U-shaped member 209, which is carried by its legs on the pulley shaft 200. Each plunger 204 is held in retracted position when the handle 206 is withdrawn from a slot 210 in the associated member 203 and rotated 90° so as to be prevented from reentering the slot 210.

Each member 203, which carries the pulleys 65 by means of the arms 201, is pivotally mounted and journalled on a shaft 211, which is laterally offset from a shaft 212, which forms a connection between the inner and outer arms 34 and 35 for relative pivoting about the axis 55a (Fig. 1), in order that the cables 62, 68, 68a, 80, 81, 82, and 83 may not unduly loosen because of unwrapping somewhat from the pulleys 65 when the outer arm 35 swings to the right as viewed in Fig. 6. The members 203 are interconnected at their upper ends by rod 213, which carries at each end a rotatable follower 214 engaging a cam 215 fixed to the inner arm 34. The cam 215 is so shaped that the pulleys 65 move upward to tighten the cables 62, 68, 68a, 80, 81, 82, and 83 and thus to compensate for unwrapping of these cables occurring when the outer arm 35 moves to the right as viewed in Fig. 6.

It is also understood that the invention is not to be limited by the details given herein but that it may be modified within the scope of the appended claims.

What is claimed is:

1. In a remote-control manipulator unit comprising inner and outer arms pivotally connected to one another at their ends, a carriage mounting the end of the inner arm remote from the outer arm, a tool connected with the end of the outer arm remote from the inner arm for movement with respect thereto, a plurality of electrical transducers, and cables extending from the tool along the outer arm to the inner arm and thence along the inner arm to its end remote from the outer arm, the cables being connected with the transducers and shifting during movement of the tool with respect to the outer arm; the combination therewith, of a tubular member attached to the carriage and extending therefrom transversely to the first arm, a support comprising a plate and a sleeve extending from a central region thereof and around the tubular member in the same direction as the tubular member extends from the carriage, means journalling the tubular member in the sleeve to provide for the inner arm a pivot axis transverse to the inner arm and adjacent the end of the inner arm remote from the outer arm, and means mounting the transducers on the same side of the support plate as the sleeve, and means guiding the cables from the end of the inner arm remote from the outer arm transversely of the inner arm through and beyond the tubular member and thence radially outwardly of the tubular member to the ends of the said transducers from the support plate.

2. In a remote-control manipulator unit comprising inner and outer arms pivotally connected to one another at their ends, a carriage journalling the end of the inner arm remote from the outer arm for angular movement of the inner arm about its own axis and being pivotable to provide for angular movement of the carriage and the inner arm about an axis perpendicular to the axis of the inner arm and adjacent the end of the inner arm remote from the outer arm, a tool mounted on the end of the outer arm remote from the inner arm for angular movement with respect thereto about three different axes including that of the second arm, flexible tie means extending from the tool and the outer arm, along the inner arm and, through the carriage, four electric transducers connected with the flexible tie means, whereby signals produced in the four transducers are causally related to opening and closing of the tool and to angular movement of the tool about the three axes with respect to the outer arm, a fifth electrical transducer for angular movement of the inner arm about the said axis perpendicular to its own axis, a sixth electrical transducer for angular movement of the outer arm with respect to the inner arm, and a seventh electrical transducer for angular movement of the inner arm about its own axis; the combination therewith, of a tubular member attached to the carriage and extending therefrom perpendicularly to the inner arm, a support comprising a plate and a sleeve extending from a central region thereof and around the tubular member in the same direction as the tubular member extends from the carriage, means journalling the tubular member in the sleeve to provide for the inner arm said pivot axis perpendicular thereto, means mounting the first six transducers on the same side of the support plate as the sleeve, means guiding the cables from the end of the inner arm remote from the outer arm into the carriage, thence generally perpendicularly to the inner arm through and beyond the tubular member, and thence radially outwardly of the tubular member to the ends of the first four transducers remote from the support plate, means for causally relating an electric signal produced in the fifth transducer to the angular movement of the inner arm about the said axis perpendicular thereto, said means including a gear fixed to the tubular member between the carriage and the support plate, a pinion meshing with the gear, and a shaft carrying the pinion and projecting through the support plate into the fifth transducer, means for causally relating an electric signal produced in the sixth transducer to angular movement of the outer arm with respect to the inner arm, said means including a gear journalled on the tubular member between the gear fixed thereto and the carriage, a pinion meshing with the gear, and a shaft carrying the pinion and projecting through the support plate into the sixth transducer, and means mounting the seventh transducer on the carriage to the side of the tubular member opposite the inner arm and in general alignment therewith.

3. In a remote-control manipulator unit comprising inner and outer arms pivotally connected to one another at their ends, a carriage mounting the end of the inner arm remote from the outer arm and being pivotable to provide for angular movement of the carriage and the inner arm about an axis perpendicular to the axis of the inner arm and adjacent the end of the inner arm remote from the outer arm, a tool mounted on the end of the outer arm remote from the inner arm for angular movement with respect thereto about three different axes including that of the arm, four electric transducers, flexible tie means extending from the tool and the outer arm, along the inner arm, and through the carriage, the four transducers being connected with the flexible tie means, whereby signals produced in the four transducers are causally related to opening and closing of the tool and to angular movement of the tool about the three axes with respect to the outer arm, a fifth electric transducer for angular movement of the inner arm about the said axis perpendicular to its own axis, a sixth electric transducer for angular movement of the outer arm with respect to the inner arm; the combination therewith, of a tubular member attached to the carriage and extending therefrom perpendicularly to the inner arm, a support comprising a plate and a sleeve extending from a central region thereof and around the tubular member in the same direction as the tubular member extends from the carriage, means journalling the tubular member in the sleeve to provide for the inner arm said pivot axis perpendicular thereto, means mounting the first six transducers on the same side of the support plate as the sleeve, means guiding the cables from the end of the inner arm remote from the outer arm into the carriage, thence generally perpendicularly to the inner arm through and beyond the tubular member, and thence radially outwardly of the tubular member to the ends of the first four transducers remote from the support plate, means for causally relating a signal produced in the fifth transducer to the angular movement of the inner arm about the said axis perpendicular thereto, said means including a gear fixed to the tubular member between the carriage and the support plate, a pinion meshing with the gear, and a shaft carrying the pinion and extending through the support plate into the fifth transducer, and means for causally relating an electric signal produced in the sixth transducer to angular movement of the outer arm with respect to the inner arm, said means including a gear journalled on the tubular member between the gear fixed thereto and the carriage, a pinion meshing with said gear, and a shaft carrying the pinion and extending through support plate into the sixth transducer.

4. In a remote control manipulator unit comprising inner and outer arms pivotally connected to one another at their ends, a carriage mounting the end of the inner arm remote from the outer arm and being pivotable to provide for angular movement of the carriage and the inner arm about an axis perpendicular to the axis of the inner arm and adjacent the end of the inner arm remote from the outer arm, a tool mounted on the end of the outer arm remote from the inner arm for angular movement with respect thereto about three different axes including that of the arm, four electric transducers, flexible tie means extending from the tool and the outer arm, along the inner arm, and through the carriage, the four transducers being connected with the flexible tie means, whereby signals produced in the four transducers are causally related to opening and closing of the tool and to angular movement of the tool about the three axes with respect to the outer arm, a fifth electric transducer for angular movement of the inner arm about the said axis perpendicular to its own axis, a sixth electric transducer for angular movement of the outer arm with respect to the inner arm; the combination therewith, of a tubular member attached to the carriage and extending therefrom perpendicularly to the inner arm, a support comprising a plate and a sleeve extending from a central region thereof and around the tubular member in the same direction as the tubular member extends from the carriage, means journalling the tubular member in the sleeve to provide for the inner arm said pivot axis perpendicular thereto, means mounting the first six transducers on the same side of the support plate as the sleeve, means guiding the cables from the end of the inner arm remote from the outer arm into the carriage, thence generally perpendicularly to the inner arm through and beyond the tubular member, and thence radially outwardly of the tubular member to the ends of the first four transducers remote from the support plate, means for causally relating a signal produced in the fifth transducer to the angular movement of the inner arm about the said axis perpendicular thereto, said means including a gear fixed to the tubular member between the carriage and the support plate, a pinion meshing with the gear, and a shaft carrying the pinion and extending through the support plate into the fifth transducer, and means for causally relating an electric signal produced in the sixth transducer to angular movement of the outer arm with respect to the inner arm, said means including a gear journalled on the tubular member between the gear fixed thereto and the carriage, a pinion meshing with said gear, a shaft carrying the pinion and extending through the support plate into the sixth transducer, an annular track member attached to the plate of the support on the same axis as the sleeve, means including roller engaging the track member for rotatably mounting the support to provide for indexing of the manipulator unit through a substantial angle, and means including a ring gear attached to the track member for rotating the support.

5. In a remote-control manipulator unit comprising inner and outer arms pivotally connected to one another at their ends, a carriage journalling the end of the inner arm remote from the outer arm for angular movement of the inner arm about its own axis and being pivotable to provide for angular movement of the carriage and the inner arm about an axis perpendicular to the axis of the inner arm and adjacent the end of the inner arm remote from the outer arm, a tool mounted on the end of the outer arm remote from the inner arm for angular movement with respect thereto about three different axes including that of the second arm, four electric transducers, flexible tie means extending from the tool and the outer arm, along the inner arm, through the carriage, the four electric transducers being connected with the flexible tie means, whereby signals produced in the four transducers are causally related to opening and closing of the tool and to angular movement of the tool about the three axes with respect to the outer arm, a fifth electrical transducer for angular movement of the inner arm about the said axis perpendicular to its own axis, a sixth electrical transducer for angular movement of the outer arm with respect to the inner arm, and a seventh electrical transducer for angular movement of the inner arm about its own axis; the combination therewith, of a tubular member attached to the carriage and extending therefrom perpendicularly to the inner arm, a support comprising a plate and a sleeve extending from a central region thereof and around the tubular member in the same direction as the tubular member extends from the carriage, means journalling the tubular member in the sleeve to provide for the inner arm said pivot axis perpendicular thereto, means mounting the first six transducers on the same side of the support plate as the sleeve, means guiding the cables from the end of the inner arm remote from the outer arm into the carriage, thence generally perpendicularly to the inner arm through and beyond the tubular member, and thence radially outwardly of the tubular member to the ends of the first four transducers remote from the support plate, means for causally relating an electric signal produced in the fifth transducer to the angular movement of the inner arm about the said axis perpendicular thereto, said means including a gear fixed to the tubular member between the carriage and the support plate, a pinion meshing with the gear, and a shaft carrying the pinion and projecting through the support plate into the fifth transducer, means for causally relating an electric signal produced in the sixth transducer to angular movement of the outer arm with respect to the inner arm, said means including a gear journalled on the tubular member between the gear fixed thereto and the carriage, a pinion meshing with the gear, and a shaft carrying the pinion and projecting through the support plate into the sixth transducer, means mounting the seventh transducer on the carriage to the side of the tubular member opposite the inner arm and in general alignment therewith, and means for rotatably mounting the support to provide for indexing of the manipulator unit through a substantial angle.

6. An assembly comprising a pair of remote-control manipulator units, each comprising inner and outer arms pivotally connected to one another at their ends, a tool connected with the end of the outer arm remote from the inner arm for movement with respect thereto, a carriage mounting the end of the inner arm remote from the outer arm, a tubular member attached to the carriage and extending therefrom transversely to the first arm, a support comprising a plate and a sleeve extending from a central region thereof and around the tubular member in the same direction as the tubular member extends from the carriage, means journalling the tubular member in the sleeve to provide for the inner arm a pivot axis transverse to the inner arm and adjacent the end of the inner arm remote from the outer arm, a plurality of electrical transducers, means mounting the transducers on the same side of the support plate as the sleeve, cables extending from the tool along the outer arm to the inner arm and thence along the inner arm to its end remote from the outer arm, the cables being connected with the transducers and shifting during movement of the tool with respect to the outer arm, and means guiding the cables from the end of the inner arm remote from the outer arm transversely of the inner arm through and beyond the tubular member and thence radially outwardly of the tubular member to the ends of the said transducers from the support plate; and means mounting the units in spaced relationship so that the support plates are parallel, the sleeve and transducers of each unit extend from the side of the support plate facing the other unit, and the arms of each unit lie on the side of the support plate facing away from the other unit.

7. The assembly specified in claim 6, the mounting means providing a pivotal support for each unit located generally in the plane of the support plate and radially outwardly thereof, whereby access is had for repair to ends of the transducers remote from the support plates when the units are swung outwardly away from one another.

References Cited in the file of this patent
UNITED STATES PATENTS
2,846,084    Goertz                 Aug. 5, 1958